Patented Jan. 15, 1952

2,582,254

UNITED STATES PATENT OFFICE 2,582,254

TREATMENT OF SILICA-ALUMINA CONTAINING GELS

Edward A. Hunter, Baton Rouge, La., assignor to Standard Oil Development Company, a corporation of Delaware No Drawing. Application May 7, 1949, Serial No. 92,071

7 Claims. (Cl. 252—455)

This invention relates to hydrocarbon conversion reactions and more particularly to the preparation of catalysts useful in hydrocarbon conversion reactions. More specifically, it relates to a method of impregnating an inorganic gel with a metal oxide.

The use of inorganic oxide gels such as the gels of silica or alumina alone or in combination as catalysts for the conversion of hydrocarbons is known. It is also known that these inorganic oxide gels may be impregnated with the oxides of metals such as aluminum or magnesium and with other catalytic components to form catalysts which are useful for conversion processes such as catalytic cracking, catalytic reforming, isomerization, hydrogenation and the like.

It is well known in the art to impregnate inorganic gels such as silica gel with the oxide of aluminum. This impregnation may be accomplished by any of the conventional methods such as the impregnation of silica hydrosol or silica hydrogel with a soluble aluminum salt and a subsequent treatment with a base such as ammonium hydroxide to precipitate the aluminum hydroxide. The impregnated silica gel is then washed to remove soluble salts, dried and calcined. The same procedure may be generally followed to impregnate silica gels with the oxide of magnesium. It can be readily seen that a material comprising a combination of silica and the oxides of aluminum, and/or magnesium, in varying proportions may be made by this impregnation technique.

However, there are certain disadvantages inherent in this method of preparing impregnated silica gels. For instance, a costly washing process is necessary to remove excess soluble salts and the amounts of metallic oxides that may be combined with or deposited upon the silica gel are limited. When impregnating silica with aluminum oxide, for example, the limitation ranges from about 13% by weight of aluminum oxide for catalysts prepared by impregnating silica hydrogel to about 20% by weight of aluminum oxide for catalysts prepared by impregnating silica hydrosol.

This invention has as its primary object a method for the impregnation of inorganic gels or catalysts with the oxides of aluminum or magnesium using alcoholates of the metals.

Another object of the invention is to provide a process for the revivification of a used silica-alumina cracking catalyst and the improvement of its resistance to steam degradation by the impregnation of the used catalyst with the oxide of aluminum.

Still another object of the invention is to increase the steam stability of a finished silica-alumina catalyst by the addition of alumina thereto.

Briefly stated, the invention comprises, allowing the catalyst or inorganic gel to absorb a certain amount of moisture, then reacting the gel holding absorbed water with an organic solution of an alkoxide of the desired metal, so that the metal alkoxide is hydrolized and decomposed to the hydrous metal oxide by the absorbed water within the gel, separating the impregnated catalyst or inorganic gel from the liquid present, and drying and calcining the impregnated catalyst or inorganic gel.

A wide variety of catalysts or inorganic gels may be impregnated with the oxides of metals such as aluminum and/or magnesium. Any catalyst or inorganic gel, which has a porous structure and will absorb water may be impregnated by this technique, and it is especially adaptable for impregnating catalysts or the gels of silica, silica-alumina, silica-alumina-magnesia, silica - alumina-boron oxide, silica-alumina-potassium oxide, alumina-zirconium oxide, silica-alumina-calcium oxide, and the like.

Other catalysts or inorganic gels which may be impregnated with the oxides of metals such as aluminum and/or magnesium are silica-alumina-molybdenum oxide, silica-alumina-molybdenum oxide-potassium oxide, alumina-molybdenum oxide, alumina-magnesia-molybdenum oxide, alumina-molybdenum oxide-zirconium oxide, alumina-silica-calcium molybdate, zinc aluminate-molybdenum oxide, zinc aluminate-molybdenum oxide-potassium oxide, and the like.

The catalyst or inorganic gel which is to be impregnated using the technique of this invention may be in the form of a powder or it may be in the form of microspheres, macrospheres or pellets of the same or varying sizes.

The catalyst or inorganic gel is treated so as to contain about 2 to 20% by weight of water and preferably from 7 to 12%. The gel may be mixed with water and then dried to the desired moisture content, or the gel may be permitted to absorb the desired amount of moisture from the air.

The catalyst or gel, with desired moisture content, is then contacted with an organic solution of an alkoxide of the desired metal, the water in the gel decomposing the alkoxide to deposit the hydrous metal oxide in the gel pores and on the gel surfaces.

The organic solution of metal alkoxide is prepared by reacting the desired metal in the form of turnings, chips, shavings, or the like with an alcohol. If it is desired, the alcohol may be admixed with a hydrocarbon, such as a petroleum distillate, boiling within the range of from 200 to 500° F., and preferably within the range of from 300 to 400° F. The mixture of hydrocarbon and alcohol is preferably one with a ratio of 50% of hydrocarbon by volume to 50% alcohol by volume. However, a mixture containing the hydrocarbon in the range of from 0% to 90% by volume may be used. The alcohol selected will be dependent on the metal used.

The reaction between the alcohol and the metal may be catalyzed by a small amount of a promoting agent, such as mercuric chloride, iodine, and the like, mercuric chloride being preferred. However, the reaction may be carried on without the use of a promoter agent. It may be desired to heat the reaction mixture to initiate the reaction between the alcohol and the metal, but once the reaction is well started, it is normally self-sustaining and in some cases cooling may be necessary to control its violence.

Although in the preparation of an aluminum alkoxide the preferred alcohol is a commercially available mixture of amyl alcohols, any alcohol of the general formula $C_nH_{(2n+1)}OH$ where "$n$" is 1 to 12 is operable. However, because of their low solubility in water, the alcohols where "$n$" is 4 to 8 are generally more advantageous than the lower alcohols.

The following is an example of the preparation of an aluminum alcoholate solution:

54 grams of aluminum turnings was dissolved in two liters of a mixture of anhydrous normal amyl alcohol and a petroleum distillate boiling within a range of from 300° F. to 400° F. The mixture of alcohol and petroleum distillate was in a ratio of one part of alcohol to one part of petroleum distillate by volume. A small amount of mercuric chloride, about 0.001 part of mercuric chloride per part of aluminum metal by weight, was added. To initiate the reaction, the mixture was heated to boiling, after which the reaction proceeded to completion without further heating.

When a magnesium alkoxide is desired, the magnesium metal, in the form of chips, turnings, and the like, is reacted with an excess of methyl or ethyl alcohol. The magnesium methoxide or ethoxide solution may then be contacted with the inorganic gel containing water of absorption. However, methyl or ethyl alcohol, which are regenerated upon hydrolysis of the magnesium methoxide or magnesium ethoxide by the absorbed water, are difficult to separate from any excess water present. Accordingly, it is preferred to admix the magnesium methoxide or magnesium ethoxide with a 50–50% by volume mixture of a hydrocarbon diluent, as above, and an alcohol of the general formula $C_nH_{(2n+1)}OH$ where "$n$" is four or greater, preferably normal amyl alcohol. Mixing of the magnesium methoxide or magnesium ethoxide with the hydrocarbon-higher boiling alcohol mixture is brought about in a distilling zone at a temperature such that the methyl or ethyl alcohol radical is displaced by the higher molecular weight alcohol radical. The regenerated methyl or ethyl alcohol vapors are then taken overhead from the distilling zone, condensed and used to react with more magnesium.

The following is an example of the preparation of a solution of magnesium amyl alkoxide:

384 grams of magnesium turnings was dissolved in 8 liters of anhydrous methyl alcohol. Cooling by an internal coil was necessary during the course of most of the reaction. To the solution of magnesium methoxide was added 8 liters of normal amyl alcohol and 8 liters of a hydrocarbon boiling between 300° F. and 400° F. Methyl alcohol was then distilled overhead leaving behind a solution of magnesium amyl alkoxide, excess amyl alcohol and hydrocarbon.

The organic solution of metal alkoxide is contacted with the moist or water containing gel in a contacting zone to react the metal alkoxide with the water. The amount of the alkoxide used will depend upon the amount of metal oxide that is to be deposited upon the gel surfaces. The contact between the moist or water holding inorganic gel and the organic solution of metal alkoxide is maintained in the contacting zone for from ½ to 6 hours and the gel and solutions are preferably mixed or agitated during the contacting period. Upon contacting the moist gel and the metal alkoxide, the moisture adsorbed in the pores and upon the surfaces of the gel hydrolizes the metal alkoxide forming hydrous metal oxide which is deposited intimately upon the surfaces and within the pores of the gel wherever absorbed moisture is present and regenerating the alcohol from which the metal alkoxide was formed. When an organic solution of aluminum amyl alkoxide is used, this hydrolysis takes place according to the following equation

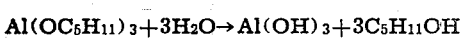

$$Al(OC_5H_{11})_3 + 3H_2O \rightarrow Al(OH)_3 + 3C_5H_{11}OH$$

Hydrous metal oxide formed is deposited uniformly and intimately upon the surfaces and within the pores of the inorganic gel and the regenerated alcohol goes into solution with the organic diluent. Water is added to the contacting zone, and the mixture agitated for from 5 to 30 minutes and then allowed to stand for from 30 to 120 minutes. Upon standing, two separate layers are formed, the solution of alcohol in the organic diluent forming the upper layer and a water slurry of the inorganic gel with its deposits of metal hydroxide forming the lower layer.

The upper layer is decanted and removed to a drying still where any dissolved or entrained water is removed by simple distillation. Vaporized water, which carries with it some small portion of the alcohol-hydrocarbon mixture, is taken overhead from the distilling zone, condensed and taken to a settling chamber. In the settling chamber, gravity separation takes place, the bottom water layer being discarded and the upper hydrocarbon-alcohol layer being returned to the drying still. From the bottom of the drying still, a dried alcohol-hydrocarbon mixture is removed to react with additional metal.

The lower layer from the contacting zone, containing the inorganic gel impregnated with a metal hydroxide is separated from the extraneous water and dried at a temperature within a range of from 150° F. to 400° F., preferably 200° F. to 250° F. It is then activated by heating for 3 hours to 16 hours, at a temperature within a range of from 750° F. to 1100° F., preferably 850° F.

The technique of this process is particularly useful in revivifying used cracking catalysts. After prolonged use silica-aluminum cracking catalysts lose activity markedly and increased amounts of carbon are formed on the catalyst in the course of the cracking operation as the catalyst ages. Using the process of this invention, a treating procedure has been developed which tends to nullify both of these undesirable tendencies and thereby revivifies the used catalyst and increases its steam stability.

In this revivification procedure, the used silica-alumina catalyst containing from 2 to 20% by weight of moisture, preferably 7 to 12%, is contacted with a hydrocarbon solution of an aluminum alkoxide, equivalent to a calculated percentage of aluminum oxide to be deposited on the catalyst. During the contacting period, the moisture present on the catalyst hydrolizes aluminum alkoxide, so that it is decomposed to hydrous aluminum oxide, regenerating the alcohol from which the alkoxide was formed. The catalyst upon the surface of which is deposited hydrous aluminum oxide is then separated from the liquid present, dried, and calcined. The mixture of the hydrocarbon solvent and the regenerated alcohol may be recovered and recycled to react with more aluminum metal, as described above.

In a modification of this procedure the used silica-alumina catalyst is digested for from 1 to 10 hours with aqueous hydrofluoric acid and/or hydrochloric acid of from 2 to 10 weight percent concentration. After the digestion treatment the catalyst is dried to the desired moisture content and contacted with a hydrocarbon solution of aluminum alkoxide as above. This treatment also markedly improves the catalyst activity and reduces the gas and carbon forming tendency of the catalyst.

The invention will be further described by reference to the following examples.

Example I 500 grams of a cracking catalyst composed of 87% silicon dioxide and 13% aluminum oxide is admixed with sufficient water to form a slurry. The catalyst is then separated from most of the water and is dried to a moisture content of 10.2% adsorbed water. The moistened catalyst is admixed with a solution of aluminum isopropoxide equivalent to 56 grams of aluminum oxide in 1000 cc. of a 50-50 mixture of isopropanol and a hydrocarbon diluent boiling within a range of from 300 to 400° F. Contact between the catalyst and the solution is maintained for 6 hours. The liquid is decanted and the catalyst product is dried. The catalyst is then activated for 3 hours at 850° F. steamed 24 hours at 1050° F. and 60 p. s. i. g. and given a standard fixed bed cracking test with East Texas light gas oil. The D+L, or fraction of product boiling below 400° F., after this cracking test provides a measure of the amount of degradation taking place during the steaming period.

| Catalyst | Fresh Catalyst | Treated Catalyst |
| --- | --- | --- |
| D+L after steaming | 25 | 31 |
| Surface Area, Sq. meters per gram | 525 | 487 |
| Percent Aluminum Oxide | 13.0 | 18.1 |

An examination of the data above indicates about a 25% increase in steam stability by the treatment which added 5% aluminum oxide to the catalyst. This is a very marked improvement and gives a catalyst of remarkable steam stability for an aluminum oxide content of 18%.

Example II 750 grams of a used cracking catalyst containing 13% aluminum oxide on silica taken from a commercial unit was treated as follows: The material was mechanically agitated for 3 hours at room temperature with a 4% solution of hydrofluoric acid containing 37.5 grams of hydrofluoric acid. The material was washed essentially free of fluoride ion with distilled water and was dried at room temperature to about 7% moisture content. The moist spent catalyst was then mixed with a solution of aluminum amyl alkoxide equivalent to 24 grams of aluminum oxide in 230 cc. of n-amyl alcohol and 1130 cc. of a hydrocarbon boiling within 300 to 400° F. The mixture was mechanically agitated for two hours at room temperature. After this agitation period, 1 liter of distilled water was added and the agitation continued for an additional hour. The catalytic material was then separated and dried in an electric oven at 225° F., and calcined 6 hours at 850° F.

The cracking activity and the gas and carbon formation tendency of the catalyst before and after treatment are compared in the following tabulation:

| | Before Treatment | After HF Treatment | After Complete Treatment |
| --- | --- | --- | --- |
| D+L [1] | 26.0 | 25.5 | 30.0 |
| CPF [2] | 1.71 | 1.44 | 1.26 |
| GPF [3] | 2.00 | 1.93 | 1.47 |

[1] Volume per cent of liquid product from standard fixed bed cracking test which boils below 400° F.
[2] Weight per cent carbon on feed divided by weight per cent carbon on feed for a fresh catalyst steam deactivated to same conversion as test catalyst.
[3] Cu. ft. gas formed by test catalyst divided by cu. ft. gas formed by fresh catalyst steam deactivated to same conversion level as test catalyst.

These data indicate a moderate increase in activity and a marked decrease in gas and carbon formation for the catalyst after the complete treatment. The preliminary treatment with hydrofluoric acid, which is known to the art, shows no effect on activity and much less improvement in gas and carbon formation.

Example III 500 grams of a fresh cracking catalyst comprising 13% alumina and 87% silica and containing 2% by weight of absorbed water is slurried with a solution of magnesium methoxide equivalent to 10 grams of magnesium oxide in 500 cc. of methanol. The temperature of the slurry is maintained at 100° F. (Temperatures within a range of from 70° F. to 145° F. are operable but those within a range of from 80° F. to 120° F. are preferred.) The slurry is agitated for 30 minutes and dried in a steam oven at 220° F. (Drying temperatures within a range of from 150° F. to 400° F. are operable but temperatures within a range of from 180° F. to 250° F. are preferred. Excess methanol and that regenerated upon decomposition of the magnesium methoxide is recovered by simple distillation-condensation procedures.) The dried product is calcined for six hours at 850° F. producing a catalyst of improved characteristics in the cracking reaction over the starting material. (Calcining temperatures of from 700° F. to 1100° F. and times from 4-16 hours are operable but the preferred temperature and time are as given.)

What is claimed is:
1. A process for the impregnation of an anhy- drous inorganic gel with a metal oxide which comprises contacting a moist inorganic gel with an organic solution of the desired metal alkoxide hydrolyzing the metal alkoxide with the moisture contained in the inorganic gel in order to impregnate said gel with the hydrous oxide of the alkoxide metal and then separating the impregnated inorganic gel.

2. A process for the impregnation of silica-containing gel with aluminum oxide which comprises allowing the silica-containing gel to adsorb water, contacting the moistened silica-containing gel with an anhydrous organic solution of aluminum alkoxide to decompose the alkoxide and impregnate the silica-containing gel with hydrous alumina and then separating the alumina impregnated silica-containing gel.

3. A process for the impregnation of a silica-alumina catalyst with aluminum oxide which comprises allowing the silica-alumina catalyst to adsorb water to a moisture content of about 2–20% by weight, contacting the moistened silica-alumina catalyst with an anhydrous organic solution of aluminum amyl alkoxide in a hydrocarbon petroleum fraction boiling between 300–400° F., so that the moisture adsorbed on the silica-alumina catalyst decomposes and hydrolyzes the aluminum amyl alkoxide forming hydrous aluminum oxide which is deposited upon the surface of the silica-alumina catalyst and regenerating n-amyl alcohol, separating the silica-alumina catalyst impregnated with hydrous aluminum oxide and drying and calcining the separated impregnated silica-alumina catalyst.

4. The method of revivifying a used silica-alumina cracking catalyst which comprises admixing the used silica-alumina cracking catalyst with a solution of a halogen acid, allowing the mixture to digest for the desired period of time, separating the digested mixture from excess acid solution, drying the digested mixture to the desired moisture content, contacting the catalyst with an anhydrous organic solution of a metal alkoxide hydrolyzing the metal alkoxide with the moisture contained in the catalyst in order to impregnate the catalyst with the hydrous oxide of the alkoxide metal and separating the impregnated catalyst.

5. A method for the revivification of a used silica-alumina cracking catalyst which comprises digesting the used catalyst with a solution of hydrofluoric acid, drying the digested catalyst to a moisture content within a range of from 2 to 20% by weight, contacting the moist catalyst with an anhydrous organic solution of aluminum amyl alkoxide in a petroleum hydrocarbon boiling between 300 to 400° F., so that the moisture present on the catalyst hydrolyzes the aluminum amyl alkoxide regenerating amyl alcohol and depositing hydrous aluminum oxide on the surface of the catalyst, separating the impregnated catalyst from the liquid present, and drying and calcining the impregnated catalyst.

6. A method of revivifying a used silica-alumina cracking catalyst which comprises mixing sufficient water with the catalyst to form a slurry, separating the catalyst from excess water, drying the separated catalyst to a moisture content within a range of from 2 to 20% by weight, contacting the moist catalyst with an anhydrous organic solution of aluminum amyl alkoxide in a petroleum hydrocarbon boiling between 300 to 400° F. so that the moisture present on the catalyst hydrolyzes the aluminum amyl alkoxide regenerating amyl alcohol and depositing hydrous aluminum oxide on the surface of the catalyst, separating the impregnated catalyst from the liquid present, and drying and calcining the impregnated catalyst.

7. A method for the impregnation of a silica-alumina catalyst with magnesium oxide which comprises allowing the catalyst to adsorb water to a moisture content of about 2 to 20% by weight, contacting the moistened catalyst with an anhydrous organic solution of magnesium methoxide in excess methanol, so that the moisture adsorbed on the catalyst decomposes and hydrolyzes the magnesium methoxide forming hydrous magnesium oxide which is deposited upon the surfaces of the catalyst and regenerating methanol, separating the catalyst impregnated with hydrous magnesium oxide and drying and calcining the separated impregnated catalyst.

EDWARD A. HUNTER.

REFERENCES CITED

The following references are of record in the file of this patent:

UNITED STATES PATENTS

| Number | Name | Date |
| --- | --- | --- |
| 2,317,803 | Reeves et al. | Apr. 27, 1943 |
| 2,342,196 | Hendrix et al. | Feb. 22, 1944 |
| 2,439,852 | Jackson | Apr. 20, 1948 |
| 2,480,627 | Bodkin et al. | Aug. 30, 1949 |